United States Patent Office 3,159,601
Patented Dec. 1, 1964

3,159,601
PLATINUM-OLEFIN COMPLEX CATALYZED ADDITION OF HYDROGEN- AND ALKENYL-SUBSTITUTED SILOXANES
Bruce A. Ashby, Schenectady, N.Y., assignor to General Electric Company, a corporation of New York
No Drawing. Filed July 2, 1962, Ser. No. 207,060
6 Claims. (Cl. 260—46.5)

This application is directed to a process for increasing the molecular weight of a mixture of organopolysiloxanes. More particularly, this invention is directed to the use of a platinum-olefin complex for increasing the molecular weight of a mixture of at least two organopolysiloxanes, one of which contains silicon-bonded hydrogen atoms and at least one of which contains silicon-bonded vinyl radicals or allyl radicals.

It is known in the art that a number of platinum-containing materials will catalyze the addition of silicon-bonded hydrogen atoms across the double bonds of compounds containing olefinic unsaturation. For example, Patent 2,970,150, Bailey, shows the use of a platinum-on-charcoal catalyst for the addition of Si—H siloxanes to compounds containing olefinic unsaturation. Patent 2,823,218, Speier et al., shows the use of chloroplatinic acid for these same types of reactions. While both platinum-on-charcoal and chloroplatinic acid are useful for many reactions, they suffer a number of disadvantages. Thus, both of these catalysts are subject to "poisoning" in the presence of a number of common materials and neither of these materials exhibits a satisfactory degree of solubility in hydrocarbon solvents. Furthermore, neither of these catalysts is as active as desired.

The present invention is based on my discovery that a certain class of platinum-olefin complexes are extremely useful in catalyzing the addition of silicon-bonded hydrogen atoms present in organopolysiloxanes to silicon-bonded vinyl or allyl radicals present in other organopolysiloxanes. This discovery allows the rapid reaction to increase the molecular weight of a mixture of at least two organopolysiloxanes, one of which contains silicon-hydrogen linkages and at least one other of which contains silicon-bonded vinyl radicals or allyl radicals.

This reaction is effected without the disadvantages found in prior art materials. For example, the platinum-olefin complexes employed in the practice of my invention are more resistant to poisoning than prior art materials and exhibit desirable solubility in hydrocarbon solvents.

The platinum-olefin complexes employed in the practice of the present invention are characterized by the formulae:

(1) $\qquad [PtCl_2 \cdot Olefin]_2$ (2) $\qquad H[PtCl_3 \cdot Olefin]$

While the olefin portion of the complexes of Formulae 1 and 2 can be almost any type of olefin, it is preferred that the olefin portion of the complex be an alkene having from 2 to 8 carbon atoms, a cycloalkene having from 5 to 7 carbon atoms, or styrene. Specific examples of olefins useful in the practice of the present invention are ethylene, propylene, the various isomers of butylene, octylene, cyclopentene, cyclohexene, cycloheptene, etc.

The catalysts within the scope of Formulae 1 and 2 are well known in the art, and their preparation and properties are described, for example, in "Coordination Compounds of Olefins With Metallic Salts," R. N. Keller, Chemical Reviews, 1940–41, 27–28, pages 229–267; and Joy and Orchin, Journal of the American Chemical Society, 81, pages 305–311 (1959).

The organopolysiloxanes containing silicon-bonded hydrogen atoms which are employed in the practice of the present invention have the formula:

(3) $\qquad (R)_a(H)_bSiO_{\frac{4-a-b}{2}}$ where R is an organic radical attached to silicon through silicon-carbon linkages and free of aliphatic unsaturation, $a$ has a value of from 1.0 to 2.5, inclusive, $b$ has a value of from 0.005 to 2.0, inclusive, and the sum of $a$ plus $b$ is equal to from 1.005 to 3.0, inclusive. Among the organic radicals represented by R of Formula 3 are monovalent hydrocarbon radicals free of olefinic unsaturation, halogenated monovalent hydrocarbon radicals free of olefinic unsaturation and cyanoalkyl radicals. More particularly, radicals represented by R include alkyl radicals, e.g., methyl, ethyl, propyl, butyl, octyl, etc. radicals; cycloalkyl radicals, e.g., cyclohexyl, cycloheptyl, etc. radicals; aryl radicals, e.g., phenyl, naphthyl, tolyl xylyl, etc. radicals; aralkyl radicals, e.g., benzyl, phenylethyl, phenylpropyl, etc. radicals; halogenated radicals of the above types, including chloromethyl, chloropropyl, chlorophenyl, dibromophenyl, etc. radicals; and cyanoalkyl radicals, e.g., beta-cyanoethyl, gamma-cyanopropyl, beta-cyanopropyl, etc. radicals. Preferably, at least 50 percent of the R groups attached to silicon in the polysiloxane of Formula 3 are methyl radicals, with up to 50 percent of the R radicals being phenyl radicals. These polysiloxanes of Formula 3 will often be referred to hereafter as "organopolysiloxane hydrides."

The organopolysiloxane hydrides which are employed in the practice of the present invention can also be characterized as copolymers containing at least one unit per molecule having the formula:

(4) $\qquad (R)_c(H)_dSiO_{\frac{4-c-d}{2}}$ with the remaining siloxane units in the organopolysiloxane having the average formula:

(5) $\qquad (R)_nSiO_{\frac{4-n}{2}}$ where R is as previously defined, $c$ has a value of from 0 to 2, inclusive, $d$ has a value of from 1 to 2, inclusive, and the sum of $c$ plus $d$ is equal to from 1.0 to 3.0, inclusive, and $n$ has a value of from 1.0 to 2.5, inclusive. Within the scope of Formula 4 are siloxane units such as hydrogen siloxane $(HSiO)_{1.5}$, methyl hydrogen siloxane units, dimethyl hydrogen siloxane units, and dihydrogen, siloxane units $(H_2SiO)$. The copolymers containing the siloxane units of Formula 4 and the siloxane units of Formula 5 are present in proportions so as to form an organopolysiloxane hydride within the scope of Formula 3. In general, the copolymers contain from 0.5 to 99.5 mole percent of the siloxane units of Formua 4 with from 0.5 to 99.5 mole percent siloxane units of Formula 5.

The organopolysiloxane hydrides are well known in the art and include such materials as 1,3-dimethyldisiloxane, 1,1,3-trimethyldisiloxane, 1,1,3,3-tetramethyldisiloxane as well as higher polymers containing up to 100,000 or more silicon atoms per molecule. Also included within the scope of Formula 3 are cyclic materials such as the cyclic trimer or cyclic tetramer of methyl hydrogen siloxane.

The organopolysiloxanes containing silicon-bonded vinyl or allyl groups which are employed in the practice of the present invention are also well known in the art and are characterized by the formula:

(6) $\qquad (R)_a(R')_bSiO_{\frac{4-a-b}{2}}$ where R, $a$ and $b$ are as previously defined and R' is a member selected from the class consisting of vinyl and allyl radicals. These vinyl or allyl-containing organopolysiloxanes, which will often hereinafter be referred to as "unsaturated organopolysiloxanes" can be characterized as copolymers of siloxane units having the formula:

(7) $(R)_c(R')_dSiO_{\frac{4-c-d}{2}}$ where R, R', c, d and the sum of c plus d is as previously defined, with an organopolysiloxane within the scope of Formula 5. Where the unsaturated organopolysiloxane is a copolymer of units within the scope of Formula 7 with an organopolysiloxane having an average formula within the scope of Formula 5, the copolymer generally contains from 0.5 to 99.5 mole percent of the units of Formula 7, and from 0.5 to 99.5 mole percent of units within the scope of Formula 5.

The preparation of the unsaturated organopolysiloxanes within the scope of Formula 6 is well known in the art. Included within the scope of the siloxanes of Formula 6 are low molecular weight materials such as vinylpentamethyldisiloxane, 1,3-divinyltetramethyldisiloxane, 1,1,3-trivinyltrimethyldisiloxane, 1,1,3,3 - tetravinyldimethyldisiloxane as well as higher polymers containing up to 100,000 or more silicon atoms per molecule. Also included within the scope of the unsaturated organopolysiloxanes within the scope of Formula 6 are cyclic materials containing silicon-bonded vinyl or allyl radicals, such as the trimer, tetramer or pentamer, of methylvinylsiloxane or methylallylsiloxane.

In carrying out the process of the present invention, the platinum-olefin complex, the unsaturated siloxane and the organopolysiloxane hydride are merely mixed together in the desired proportions and maintained at the reaction temperature for a time sufficient to allow the reaction to be effected. The proportions of the various ingredients employed in the practice of the present invention can vary within extremely wide limits and these proportions of ingredients are not affected by the stoichiometry of the addition reaction involved, since many of the products prepared by the process of this invention exhibit satisfactory properties for intended purposes even when the final product contains unreacted silicon-bonded vinyl or allyl radicals or contains unreacted silicon-hydrogen linkages. However, for economic reasons, it is generally preferred that the unsaturated organopolysiloxane and the organopolysiloxane hydride be present in such proportions that the reaction mixture contain from about 0.05 to 20 silicon-hydrogen linkages per silicon-bonded vinyl or allyl group. Often, it is desirable to have an equal number of silicon-hydrogen linkages and vinyl or allyl radicals in the reaction mixture so as to produce a final product which will be substantially free of either silicon-hydrogen linkages or silicon-bonded vinyl or allyl radicals.

The platinum-olefin complex is generally added to the reaction mixture in an amount related to the amount of silicon-bonded unsaturated vinyl or allyl radicals in the unsaturated organopolysiloxane. One especially desirable feature of the process of the present invention is that the platinum-olefin complex can be added in relatively minute quantities and still act satisfactorily as a catalyst for the addition of silicon-hydrogen linkages to vinyl or allyl radicals. Thus, satisfactory reaction can occur when the platinum-olefin complex is present in an amount sufficient to provide as little as one atom of platinum per million silicon-bonded vinyl or allyl groups in the unsaturated organopolysiloxane. Amounts of the platinum-olefin complex sufficient to provide as high as one platinum atom per one hundred silicon-bonded vinyl or allyl radicals can be employed. In general, it is preferred to employ the platinum-olefin complex in an amount sufficient to provide one platinum atom per 1,000 to one platinum atom per 100,000 silicon-bonded vinyl or allyl groups in the unsaturated siloxane.

When employing minute quantities of the platinum-olefin complex as a catalyst, it is often desirable to dissolve the complex in a solvent which is inert to the reactants under the conditions of the reaction so as to facilitate the uniform dispersion or solution of the platinum-olefin complex in the unsaturated organopolysiloxane and the organopolysiloxane hydride. Suitable solvents include, for example, hydrocarbon solvents such as xylene, benzene, toluene, mineral spirits and the like, as well as oxygenated solvents such as dioxane, tetrahydrofuran, etc. Where a solvent is employed, the amount of solvent is not critical and satisfactory solutions of platinum-olefin complex can be prepared which contain from about 0.01 to 0.0001 gram of complex per gram of solution.

The characteristics of products prepared by the process of the present invention can vary greatly with the nature of the starting materials. For example, when the reaction mixture comprises vinylpentamethyldisiloxane and pentamethyldisiloxane, the reaction product is a material containing two disiloxane units joined by a silethylene group. In the case of a reaction mixture which contains a compound such as 1,1,3,3-tetramethyldisiloxane and a high molecular weight organopolysiloxane containing a plurality of silicon-bonded vinyl or allyl groups per molecule, the resulting product is a cross-linked silicone.

The process of the present invention can employ a wide range of temperatures, for example, from temperatures as low as room temperature up to temperatures of the order of 100 to 150° C. The time required for effecting the reaction can also vary within wide limits, depending upon the particular reactants involved, the proportions of reactants and the reaction temperature. Thus, reaction can be effected in times which vary from a few minutes up to 24 hours or more. If all other factors are equal, the rate of reaction increases as the temperature increases and as the concentration of platinum-olefin complex in the reaction mixture increases.

The following examples are illustrative of the practice of my invention and are not intended for purposes of limitation. All parts are by weight.

*Example 1*

This example illustrates the preparation of a catalyst employed in the practice of the present invention. One part of chloroplatinic acid hexahydrate was dissolved in 95 parts ethyl alcohol and heated for 2 hours at reflux. The resulting solution was then concentrated at room temperature by pumping off excess ethyl alcohol to produce a gummy orange residue. This residue was extracted with chloroform and the chloroform was removed by vacuum to produce a yellow, powdery residue which was a platinum-ethylene complex having the formula:

$$H(PtCl_3 \cdot C_2H_4)$$

*Example 2*

This example illustrates the preparation of another catalyst employed in the practice of the present invention. Twenty-five parts of $K_2PtCl_4$ was dissolved in 130 parts of 4% aqueous hydrochloric acid in a pressure vessel. After flushing the vessel with nitrogen, the reaction vessel was connected to a source of ethylene and subjected to a continuous ethylene pressure of about 45 p.s.i. for 36 hours. The reaction mixture was then placed in a vacuum desiccator containing sulfuric acid and potassium hydroxide pellets and maintained under vacuum to evaporate the solvent. The resulting crystals were then dissolved in 4% alcoholic hydrochloric acid and undissolved material was removed by filtration. The filtrate was then pumped under vacuum at room temperature to remove all liquids. The resulting yellow powder was a platinum-ethylene complex having the formula:

$$(PtCl_2 \cdot C_2H_4)_2$$

The identity of this material was confirmed by analysis which showed the presence of 24.9 percent chlorine as compared with the theoretical value of 24.1 percent.

Example 3

Following a procedure well known in the art, a methylvinylpolysiloxane was prepared having a viscosity of about 200 centipoises at 25° C. and containing about 1.0 mole percent methylvinylsiloxane units, 1.0 mole percent dimethylvinylsiloxane units and 98 mole percent dimethylsiloxane units. To a portion of this methylvinylpolysiloxane fluid was added sufficient 1,1,3,3-tetramethyldisiloxane to provide 1.6 silicon-hydrogen groups per silicon-bonded vinyl group and a sufficient amount of the catalyst of Example 2 to provide one atom of platinum for every 2700 silicon-bonded vinyl groups. The catalyst of Example 2 was added as a solution prepared by dissolving 15.4 parts of the catalyst in 10,000 parts of benzene. The resulting reaction mixture was heated at 120° C. for 15 minutes, during which time it was converted to a tough, transparent gel.

Example 4

The procedure of Example 3 is repeated except that the catalyst was the catalyst of Example 1, one part of which is dissolved in 100 parts toluene and added to the mixture of the methylvinylpolysiloxane and the tetramethyldisiloxane in an amount sufficient to provide one platinum atom per 10,000 silicon-bonded vinyl groups. This mixture is heated at a temperature of 100° C. for 20 minutes to produce a clear, rubbery gel.

Example 5

A silicone rubber compound was prepared by mixing a trimethylsilyl chain-stopped polydiorganosiloxane having a viscosity in excess of 10,000,000 centipoises at 25° C. and containing 0.2 mole percent methylvinylsiloxane units, 2 mole percent diphenylsiloxane units with the remaining diorganosiloxane units being dimethylsiloxane units. Five hundred parts of this methylphenylvinylpolysiloxane gum was mixed with 200 parts of a finely divided silica aerogel, 0.90 part of the cyclic tetramer of methylhydrogensiloxane and a sufficient amount of the platinum-ethylene complex of Example 2, to provide one platinum atom per 1300 silicon-bonded vinyl groups. This mixture contained about 1.3 silicon-bonded hydrogen atoms per silicon-bonded vinyl group. The platinum-olefin complex was added as a solution prepared by dissolving 52.6 parts of the catalyst of Example 2 in 100 parts tetrahydrofuran. After milling the ingredients thoroughly, the mixture was heated in a mold for 15 minutes at 150° C., post-baked for one hour in a circulating air oven at 150° C., and physical properties were then measured. The resulting product was a cured silicone rubber having a Shore A hardness of 30, a tensile strength of 750 p.s.i., an elongation of 1100 percent and a tear strength of 150 pounds per inch.

Example 6

A dimethylhydrogensilyl chain-stopped dimethylpolysiloxane fluid was prepared which contained 2 mole percent dimethylhydrogensiloxane units and 98 mole percent dimethylsiloxane units. To a portion of this methylhydrogenpolysiloxane fluid was added a sufficient amount of 1,1,3,3-tetramethyl-1,3-divinyldisiloxane to provide 0.1 mole silicon-bonded hydrogen atom per mole of silicon-bonded vinyl radicals. The resulting solution was then catalyzed by adding a sufficient amount of a solution of 15.4 parts of the platinum-ethylene complex of Example 2 in 10,000 parts benzene to provide 1.0 platinum atom per 100,000 silicon-bonded vinyl groups. The resulting catalyzed mixture was heated at a temperature of about 115°C. for one hour to produce a tough, clear, colorless gel.

Example 7

A catalyzed reaction mixture was prepared identical to that of Example 6 except that the catalyst was added as a solution prepared from 18 parts of a platinum-cyclohexene complex having the formula:

$$(PtCl_2 \cdot C_6H_{10})_2$$

in 10,000 parts benzene. The identity of this catalyst was confirmed by analysis which showed the presence of 20.3 percent chlorine as compared with the theoretical value of 20.4 percent. The catalyst was again added in an amount sufficient to provide 1.0 atom of platinum per 100,000 silicon-bonded vinyl groups. When this catalyzed mixture was heated at 115° C. for 30 minutes, a tough, clear gel was formed.

Example 8

A reaction mixture was prepared by mixing equal parts by weight of a methylvinylpolysiloxane and a methylhydrogenpolysiloxane fluid. Each of the fluids had a viscosity of about 200 centipoises when measured at 25° C. The methylhydrogenpolysiloxane fluid was trimethylsilyl chain-stopped and consisted of 2.0 mole percent methylhydrogensiloxane units with the remainder of the diorganosiloxane units being dimethylsiloxane units. The methylvinylpolysiloxane fluid corresponded to the methylhydrogenpolysiloxane fluid except that it contained 2.0 mole percent methylvinylsiloxane units instead of the 2 mole percent of the methylhydrogensiloxane units. To the mixture of these two fluids was added a sufficient amount of the powdered catalyst of Example 2 to provide 1.0 atom of platinum per 1000 silicon-bonded groups. The reaction mixture was stirred to insure thorough dispersion of the catalyst and then heated at a temperature of 130° C. for 7 minutes, during which time the solution was converted to a clear, hard gel.

Example 9

When the procedure of Example 8 is repeated except that the catalyst is a platinum-styrene complex having the formula:

$$(PtCl_2 \cdot C_6H_5C_2H_4)_2$$

the resulting catalyzed solution is cured to a hard transparent gel in about 9 minutes.

While the foregoing examples have illustrated a number of the embodiments of my invention, it should be understood that the process of the present invention is broadly applicable to the reaction between a broad class of organopolysiloxanes containing silicon-bonded hydrogen atoms and a broad class of organopolysiloxanes containing silicon-bonded vinyl or allyl radicals. For example, instead of employing the process of the present invention with materials which are characterized as "pure" organopolysiloxanes, the process of the present invention is applicable to the use of copolymers containing both siloxane units and silphenylene or silalkylene linkages and which also contain either silicon-bonded hydrogen atoms or silicon-bonded vinyl or allyl radicals. In addition to reaction mixtures in which each organopolysiloxane component contains either silicon-bonded hydrogen atoms or silicon-bonded unsaturated groups, it should be understood that the present invention is applicable to mixtures of organopolysiloxanes which include, in addition, organopolysiloxanes which are free of either silicon-bonded hydrogen atoms or silicon-bonded vinyl or allyl groups. In such case, the organopolysiloxane free of these groups acts as a plasticizer or diluent during the curing of the compositions or during the increasing of the molecular weight of the compositions.

The products prepared by the process of the present invention have the same type of utility as other organopolysiloxanes, but in addition are particularly useful in potting and encapsulating applications. This utility is derived from the fact that the addition reaction between the silicon-bonded hydrogen atom and the silicon-bonded vinyl or allyl radical is irreversible and products which are cured by the process of the present invention do not tend to revert to their original form. Because the process of the present invention allows the conversion of liquid materials to solid materials without the need for solvents, a catalyzed mixture employed in the practice of the present invention can be poured about a component to be encapsulated and the entire encapsulated component can be heated at the temperature at which cure is to be effected until the liquid is converted to a solid material.

What I claim as new and desire to secure by Letters Patent of the United States is:

1. A process for the addition of the silicon-bonded hydrogen of a first organopolysiloxane having the formula:

$$(R)_a(H)_b SiO_{\frac{4-a-b}{2}}$$

across the silicon-bonded aliphatically unsaturated groups of a second organopolysiloxane having the formula:

$$(R)_a(R')_b SiO_{\frac{4-a-b}{2}}$$

which process comprises forming a mixture of said first organopolysiloxane and said second organopolysiloxane with a platinum-olefin complex selected from the class consisting of:

$$[PtCl_2 \cdot Olefin]_2$$

and $$H[PtCl_3 \cdot Olefin]$$

and maintaining said mixture at a temperature of from room temperature to about 150° C. for a sufficient time to effect said addition, where R is a member selected from the class consisting of monovalent hydrocarbon radicals free of aliphatic unsaturation, halogenated monovalent hydrocarbon radicals free of aliphatic unsaturation and cyanoalkyl radicals; R' is a member selected from the class consisting of vinyl and allyl radicals, $a$ has a value of from 1.0 to 2.5, inclusive, $b$ has a value of from 0.005 to 2.0, inclusive, the sum of $a$ plus $b$ is equal to from 1.05 to 3.0, inclusive, the olefin in said platinum-olefin complex being a member selected from the class consisting of alkenes having from 2 to 8 carbon atoms, inclusive, cycloalkenes having from 5 to 7 carbon atoms, inclusive, and styrene.

2. The process of claim 1 in which the platinum-olefin complex has the formula:

$$[PtCl_2 \cdot Olefin]_2$$

3. The process of claim 1 in which the platinum-olefin complex has the formula:

$$H[PtCl_3 \cdot Olefin]$$

4. The process of claim 1 in which the platinum-olefin complex is a platinum-ethylene complex having the formula:

$$(PtCl_2 \cdot C_2H_4)_2$$

5. The process of claim 1 in which the platinum-olefin complex is a platinum-cyclohexene complex having the formula:

$$(PtCl_2 \cdot C_6H_{10})_2$$

6. The process of claim 1 in which R is methyl and R' is vinyl.

References Cited by the Examiner
UNITED STATES PATENTS

| | | | |
|---|---|---|---|
| 2,851,473 | 9/58 | Wagner et al. | 260—46.5 |
| 2,915,497 | 12/59 | Clark | 260—46.5 |
| 2,970,150 | 1/61 | Bailey | 260—46.5 |

MURRAY TILLMAN, *Primary Examiner.*

WILLIAM H. SHORT, *Examiner.*